Reissue 27,289

July 22, 1969 B. A. SAWYER 3,457,482

MAGNETIC POSITIONING DEVICE

Filed Oct. 30, 1967 5 Sheets-Sheet 1

INVENTOR
BRUCE A. SAWYER
BY HIS ATTORNEYS
HARRIS, KIECH, RUSSELL & KERN

July 22, 1969 B. A. SAWYER 3,457,482

MAGNETIC POSITIONING DEVICE

Filed Oct. 30, 1967 5 Sheets-Sheet 2

INVENTOR
BRUCE A. SAWYER
BY HIS ATTORNEYS
HARRIS, KIECH, RUSSELL & KERN

INVENTOR
BRUCE A. SAWYER
BY HIS ATTORNEYS
HARRIS, KIECH, RUSSELL & KERN

INVENTOR
BRUCE A. SAWYER
BY HIS ATTORNEYS
HARRIS, KIECH, RUSSELL & KERN

INVENTOR
BRUCE A. SAWYER
BY HIS ATTORNEYS
HARRIS, KIECH, RUSSELL & KERN 3,457,482
MAGNETIC POSITIONING DEVICE
Bruce A. Sawyer, 20120 Allentown Drive, Woodland Hills, Calif. 91364
Filed Oct. 30, 1967, Ser. No. 678,842
Int. Cl. H02p *1/54, 7/68, 7/74*
U.S. Cl. 318—38 13 Claims

ABSTRACT OF THE DISCLOSURE

A magnetic system for moving a marking tool over a surface for plotting curves, graphs and other data. A head incorporating two parallel sets of magnets along each of two perpendicular axes. A plate having a grid of zones of magnetic material. Driving circuitry for selectively energizing magnet coils in response to input stepping signals for moving the head over the plate along each axis.

This invention relates to plotters and to drive systems suitable for use with plotters and other positioning devices, and is an improvement on the system of my co-pending application entitled "Magnetic Positioning Device," Ser. No. 554,181, filed May 31, 1966, now Patent No. 3,376,578.

My aforesaid co-pending application discloses a magnetic stepping system incorporating a head for moving along a plate and carrying a marker for plotting data on a sheet of paper or the like disposed on the plate. Sets of magnets are disposed in the head and each set includes a plurality of individual magnets, typically three, providing what can be referred to as a three-phase system. It is the object of the present invention to provide a two-phase polarized system which appears to have a number of advantages over three-phase and higher phase systems. A two-phase system utilizes two magnets in each set and, with bidirectional currents in each coil, operates as a four-phase system.

The two-phase system of the present invention permits a simple coil and core arrangement. The two-phase system utilizes a permanent polarizing or bias flux such as can be supplied by permanent magnets, resulting in a constant holding force. Smaller coil losses can be obtained because the permanent magnets supply a portion of the energy required in the stepping operation. A shorter time constant can be obtained because the quadrature or transverse flux paths in the cores can be designed to operate well into saturation thereby lowering the incremental inductance. Further, the two-phase system permits utilization of acceleration and braking currents in the otherwise nonenergized coils during a stepping operation so that all coils are working substantially all of the time.

Other objects, advantages, features and results will more fully appear in the course of the following description. The drawings merely show and the description merely describes preferred embodiments of the present invention which are given by way of illustration or example.

The system includes a plate member 20 and a head member 21. The upper surface of the plate member carries a grid of nonmagnetic material enclosing zones of magnetic material, with the grid defining first and second axes which normally are orthogonal. These axes are sometimes referred to as the *x*-axis and the *y*-axis.

Figure 11:
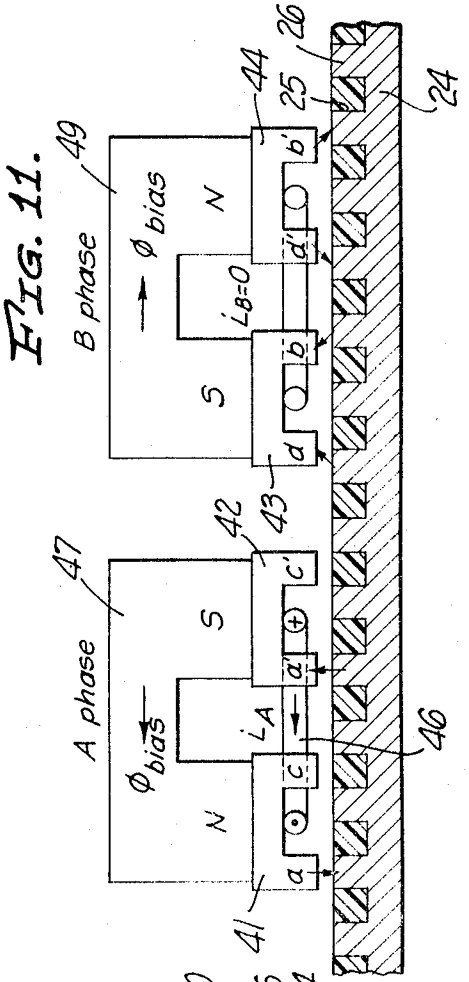
FIGURE 11 is a diagrammatical view similar to that of FIGURE 4 illustrating the operation of the system.

Typically the plate member 20 may be a sheet 24 of ferromagnetic material such as iron, having a plurality of parallel grooves 25 formed therein, with one set of grooves normal to the *x*-axis and another set of grooves normal to the *y*-axis (FIGURE 11). Zones or teeth of magnetic material 26 project upwardly between the grooves. In the preferred structure illustrated in the drawings, the grooves are at right angles to each other and are equally spaced along both axes, leaving the projecting zones of magnetic material of square cross section. In a typical structure, the grooves or slot 25 are .020 inch wide and .020 inch deep and are spaced .040 inch apart between center lines along both axes. The grooves may be left open with the air serving as a nonmagnetic material, but it is preferred to fill the grooves with a plastic or other nonmagnetic solids to provide a smooth upper surface for the plate member.

In a typical plotter, a sheet of paper 28 rests on the plate member 20 and the head member moves over the sheet 28. Means may be provided for holding the paper in position on the plate member and one such means is illustrated in my aforesaid co-pending application.

The head member includes four sets of magnets 30, 31, 32, 33 mounted in a housing or base 34 with the pole faces of the magnets at the surface of the base. Typically the base 34 is an aluminum or plastic plate having four apertures 35 therein for receiving the magnet sets and a central aperture 36 for an air bearing screw, to be described herein below.

The magnet sets 30, 32, are disposed parallel to one of the axes of the grid, say the *x*-axis, and are utilized to propel and position the head member along the *x*-axis. Similarly, the sets 31 and 33 are utilized to propel and position the head member along the other axis, typically the *y*-axis.

Figures 2, 3, 5, 6, 7:
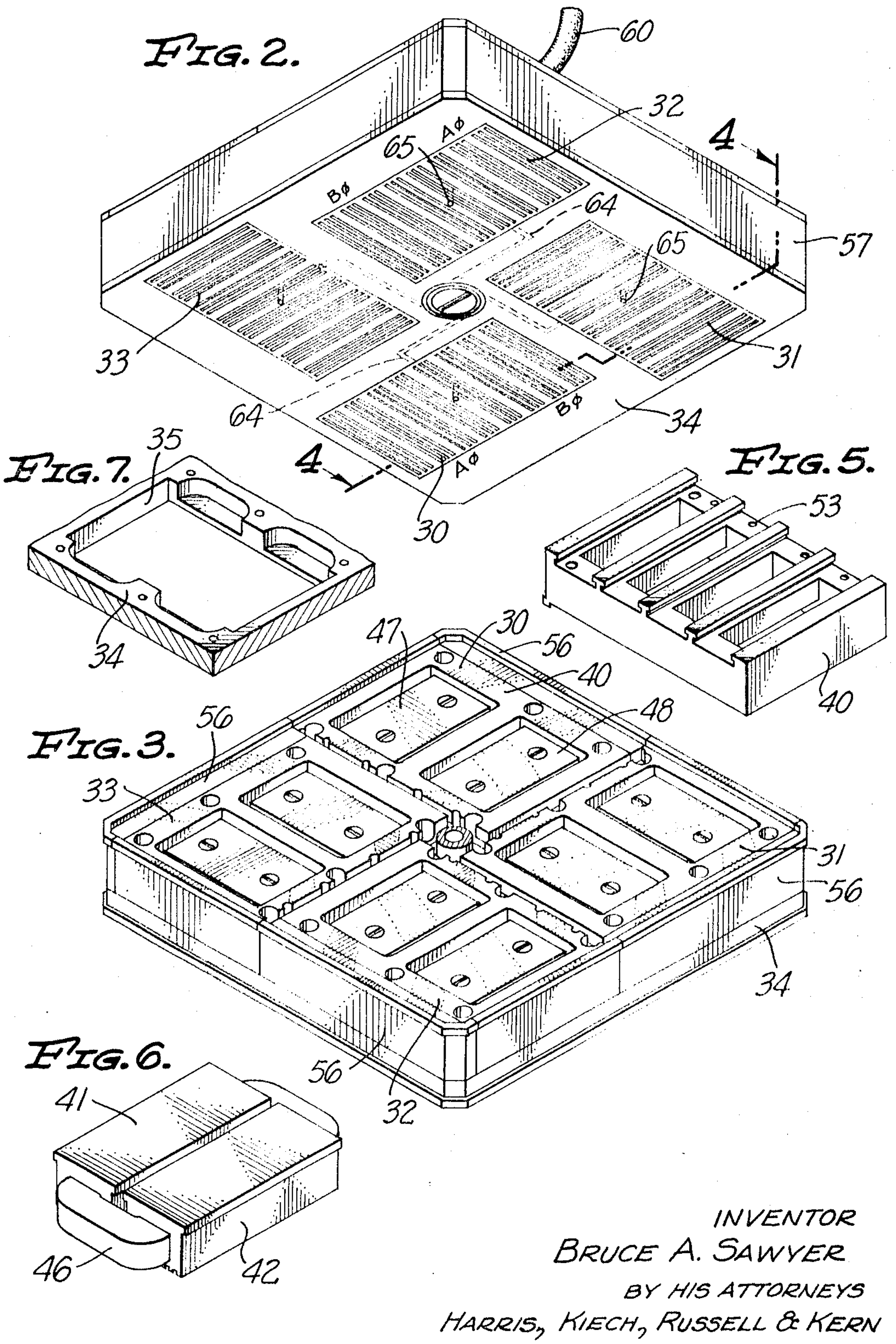
FIGURE 2 is a perspective view from the bottom of the head of FIGURE 1, with the marking pen omitted.
FIGURE 3 is a perspective view from the top of the head, with the top cover removed.
FIGURE 5 is a perspective view of a frame shown inverted.
FIGURE 6 is a perspective view of a coil and pole piece assembly.
FIGURE 7 is a perspective view of a portion of the housing.
Figure 4:
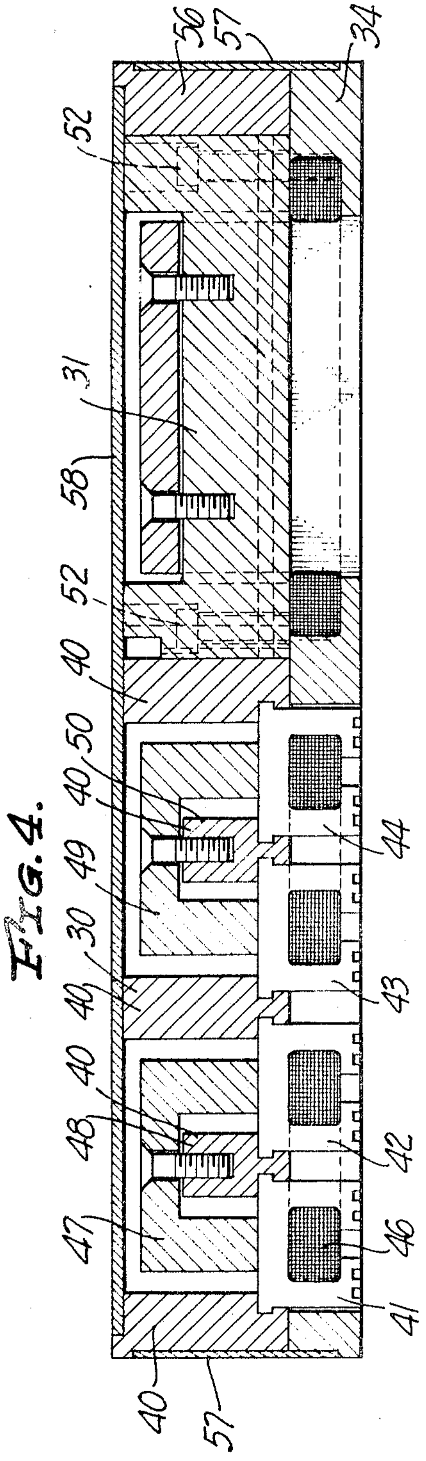
FIGURE 4 is an enlarged sectional view taken along the line 4—4 of FIGURE 2.

The construction of the four sets of magnets may be the same and one will be described in detail. Each set comprises two magnets and each magnet has two pole pieces. The magnet set 30 includes a frame 40 and pole pieces 41, 42, 43, 44 (FIGURE 4). Each of the pole pieces 41–44 comprises a stack of lamination stampings and two pole pieces 41, 42 with at coil 46 therein are shown in FIGURE 6. The top view of the frame 40 is shown in FIGURE 3 and a bottom view in FIGURE 5. Each of the pole pieces 41, 42 with a coil 46 therein are shown in upper corner for slidably engaging corresponding grooves in the frame 40. A U-shaped yoke 47 is affixed to a rib 48 of the frame 40 by a screw and a similar yoke 49 is affixed to a rib 50 of the frame 40. The frame 40 is made of a nonmagnetic material such as aluminum and in the preferred embodiment of the yokes 47 and 49 are permanent magnets which provide a bias or polarizing flux in the associated pole pieces.

The face of each of the pole pieces 41–44 has one or more ridges of magnetic material and preferably is provided with a plurality of ridges of the same width and spacing as the zones 26 of magnetic material in the plate member 24.

The magnet sets are positioned in the corresponding apertures in the base 34 and are held in place by screws 52. The openings 53 in the frame 40 (FIGURE 5) and the channel or relieved section 54 in the frame 40 (FIGURE 8) provide space for wiring. Filler blocks 56 may be disposed at the four corners of the head to provide a regular outline with the blocks held in place by a band 57 and screws (not shown). A top cover plate 58 may be positioned over the magnet sets for appearance and cleanliness.

Figure 8:
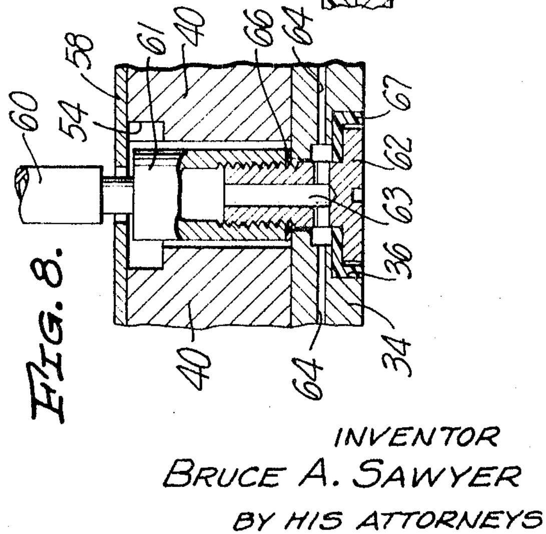
FIGURE 8 is an enlarged partial sectional view taken along the line 8—8 of FIGURE 1.

Means may be provided for spacing the head member from the plate member to prevent direct contact between the members or between the head member and the paper resting on the plate member and thereby eliminate friction forces between the two members. Various arrangements may be used including fluid bearings, wheels or balls, and the air bearing described in my aforesaid copending application is utilized in the head member disclosed in this application. A conduit for a supply of air under pressure and a cable for the electrical connection may be included in a control line 60 connected to the head member 21. The air conduit of the control line terminates on a tube 61 held in place by a screw 62 positioned in the aperture 36 of the base 34 (FIGURE 8). A passage 63 in the screw 62 provides communication with four passages 64 radiating outward from the screw through the base 34 and terminating in outlet openings 65 (FIGURE 2). A gasket 66 provides a seal between the tube 61 and the base, and another gasket 67 provides a seal between the screw 62 and the base.

With this arrangement, there is a constant flow of air through the conduit of the control line 60 into the head member, through the passages 64 and openings 65, and outward to the atmosphere between the bottom surface of the head member and the surface of the plate member. This air flow provides an air bearing between the two members. The attraction force provided by the magnetic coupling between the members and the repulsion force provided by the air bearing are balanced by appropriate adjustment of the air bearing orifice characteristics and the air supply pressure to maintain the head member at a substantially constant spacing above the plate member, typically in the order of one to a few thousandths of an inch.

Figures 1, 9, 10:
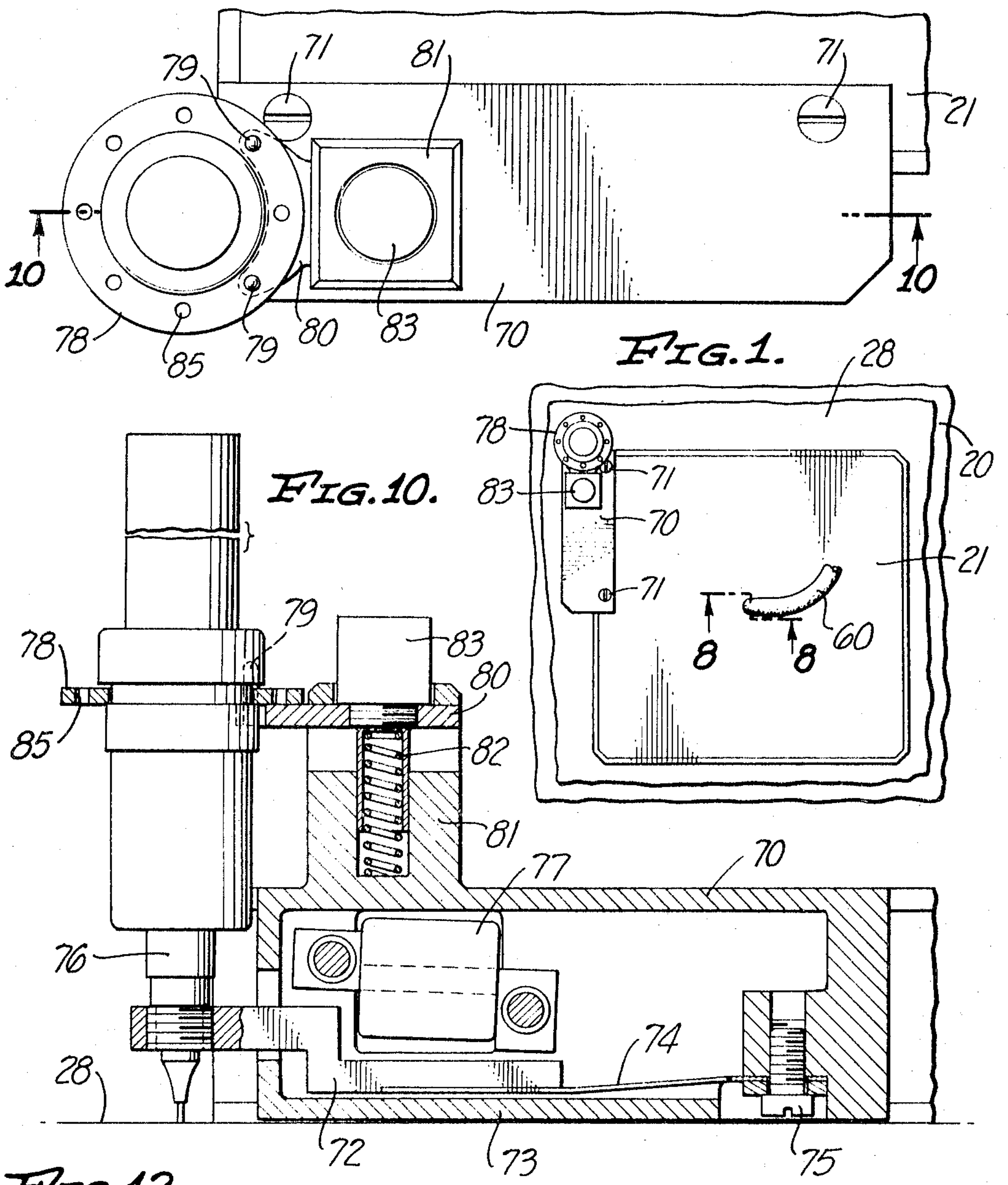
FIGURE 1 is a top view of a chart plotter incorporating a preferred embodiment of the invention.
FIGURE 9 is an enlarged top view of the marking pen of FIGURE 1.
FIGURE 10 is a sectional view taken along the line 10—10 of FIGURE 9.

Referring to FIGURE 1, a tool or marker carrier 70 may be mounted on the head member 21 at one corner thereof by screws 71. A variety of tools and markers, and a variety of carriers may be utilized and a preferred embodiment is illustrated in FIGURES 9 and 10. An arm 72 is supported within a body 73 on a spring 74, with the spring attached to the body by a screw 75. A pen 76 is threadedly inserted into an opening in the outer end of the arm 72. An electromagnet 77 is disposed within the body 73 and, when energized, attracts the arm 72 and lifts the tip of the pen 76 from the sheet 28 resting on the plate member 20. A ring 78 is affixed to the body of the pen 76 and cooperates with pins 79 to provide a locking adjustment and to provide a guide for vertical movement of the pen. The pins 79 are mounted in a plate 80 carried in a boss 81 of the body 73. A spring 82 urges the plate 80 upward and a button 83 provides for manual compression of the spring 82 for disengaging the pins 79 from openings 85 of the ring 78.

The body of the pen may be rotated to adjust the vertical position of the tip by depressing a button 83 and disengaging the pins 79 from the ring 78. After the desired adjustment is achieved, the button 83 is released permitting the pins 79 to enter openings 85 of the ring 78 thereby locking the ring in place. The pins 79 are made sufficiently long so that the pen may be moved up and down by the magnet 77 while remaining in engagement with the openings 85, thereby providing a guide and support for the upper portion of the pen 76.

The operation of the system will be described in conjunction with the diagram of FIGURE 11. The pole piece 41 has two pole faces *a* and *c*. Each pole face may comprise a single ridge substantially the width of a zone 26 of the plate member 24, as illustrated in FIGURE 11. Alternatively, each pole face may comprise a plurality of spaced ridges, as illustrated in FIGURE 4. The pole faces *a* and *c* are spaced such that when one is over a zone of magnetic material 26 of the plate member, the other is over the nonmagnetic material. That is to say, the spacing between the center lines of the pole faces *a* and *c* is $p(n \pm 1/2)$ where *n* is any whole number and *p* is the pitch of the grid or the distance from a center line of one groove or one tooth to the center line of the next groove or tooth of the plate member. The pole pieces 42, 43, and 44 are similarly constructed.

The two pole pieces 41, 42 of the magnet 47 are spaced so that the pole faces *a* and *a'* are at magnetic zones or teeth at the same time. That is to say, the spacing between the center lines of the pole pieces is *np*.

The magnet 49 is constructed the same as the magnet 47. The two magnets of the set are spaced so that when the pole faces of one magnet are directly over a tooth or a groove, the pole faces of the other magnet are midway between the tooth and groove. Thus, the center lines of corresponding pole faces of the two magnets are spaced $p(n \pm 1/4)$. The two magnets of a set are designated the A phase and B phase magnets. In the preferred arrangement, using two parallel sets of magnets as illustrated in FIGURE 2, the magnets of one set, here the set 30, are arranged with the A phase to the left and the B phase to the right, and the magnets of the other set, here the set 32, are arranged with the B phase to the left and the A phase to the right. This arrangement provides an improved balancing of forces as discussed in my aforesaid application. With this arrangement, the magnets of one set are spaced $p(n+1/4)$ and the magnets on the other set are spaced $p(n-1/4)$. Where the A phase of both sets are to the left or to the right, the spacing for both sets will be the same, that is either both are $+1/4$ or both are $-1/4$.

In FIGURE 11, the current $i_A$ is full on, thereby adding to the bias flux produced by the permanent magnet in the pole faces *a* and *a'* and reducing the flux in the pole faces *c* and *c'* to near zero. At this time, the current $i_B$ in the coil of the magnets 49 is zero and the flux in the pole faces *d*, *d'*, *b* and *b'* are nearly identical and of the order of ½ that in *a* and *a'*. The phasors corresponding to *b–b'* and *d–d'* have magnitudes approximately ¼ those of *a–a'*. The *d–d'* phasors are angularly displaced from the *b–b'* phasors by 180°, so the net result is that *b–b'* and *d–d'* contribute no first order tangential forces between the head and plate in the horizontal direction. Under these conditions, the head remains in the position of FIGURE 11.

In order to step the head to the right, the A phase current is turned off and the B phase is turned on with a polarity such that the current is leaving the paper at pole piece 43 and entering the paper at pole piece 44. The magnetic flux at *d* and *d'* goes to zero and the flux at *b* and *b'* goes to a maximum, thus producing a positive force moving the head to the right. Another step to the right is made by turning the B phase current off and turning the A phase current on with a polarity opposite that shown in FIGURE 11. The head will move to the right another step with the pole faces *c* and *c'* positioned over the teeth or magnetic zones of the plate 24. For the next step, the A phase current is turned off and the B phase current is turned on with the polarity opposite that previously mentioned. The next step is made by returning the currents to the condition shown in FIGURE 11. Stepping in the opposite direction is achieved by switching currents in the opposite sequence. Thus, it is seen that a four phase stepping operation is obtained with the two phase construction of the device. When two sets of magnets are utilized in parallel, the A phase coils of both sets are energized at the same time and the B phase coils of both sets are energized at the same time.

More rapid operation can be achieved by utilizing accelerating and/or braking currents in the normally unenergized coil. For example, after the B phase coil has been energized and the A phase coil has been turned off and after the head has moved a small distance, a current pulse of polarity opposite that used in the A phase coil may be applied to the A phase coil. This current pulse reduces the flux in the *a* and *a'* pole faces and increases the flux in the *c* and *c'* pole faces to provide an additional component of force thereby providing acceleration of movement. Subsequently, another current pulse of opposite polarity may be applied to the A phase coil to provide a component of force opposing the movement and thereby braking the movement to reduce overshoot.

Figure 12:
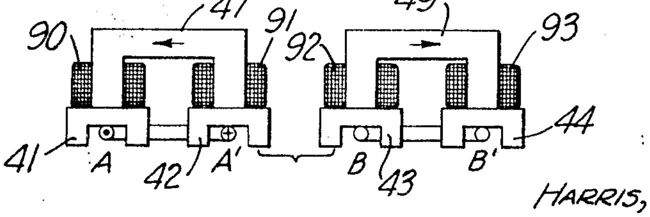
FIGURE 12 is a view similar to that of FIGURE 11 illustrating an alternative construction for obtaining the bias flux.

An alternative arrangement utilizing continuously energized coils in place of the permanent magnet is illustrated in FIGURE 12, where components corresponding to those of FIGURE 11 are identified by the same reference numerals. The yokes 47', 49' may have the same shape as the permanent magnet yokes 47, 49 and may be installed in the same manner. However, they are made of a magnetic material rather than being permanently magnetized and preferably are formed of laminations with overlapping joints and integral with the pole pieces. Coils 90, 91, 92, 93 are mounted on the yokes and are energized with appropriate currents to provide the same bias fluxes as the permanent magnets 47, 49.

Figure 13:
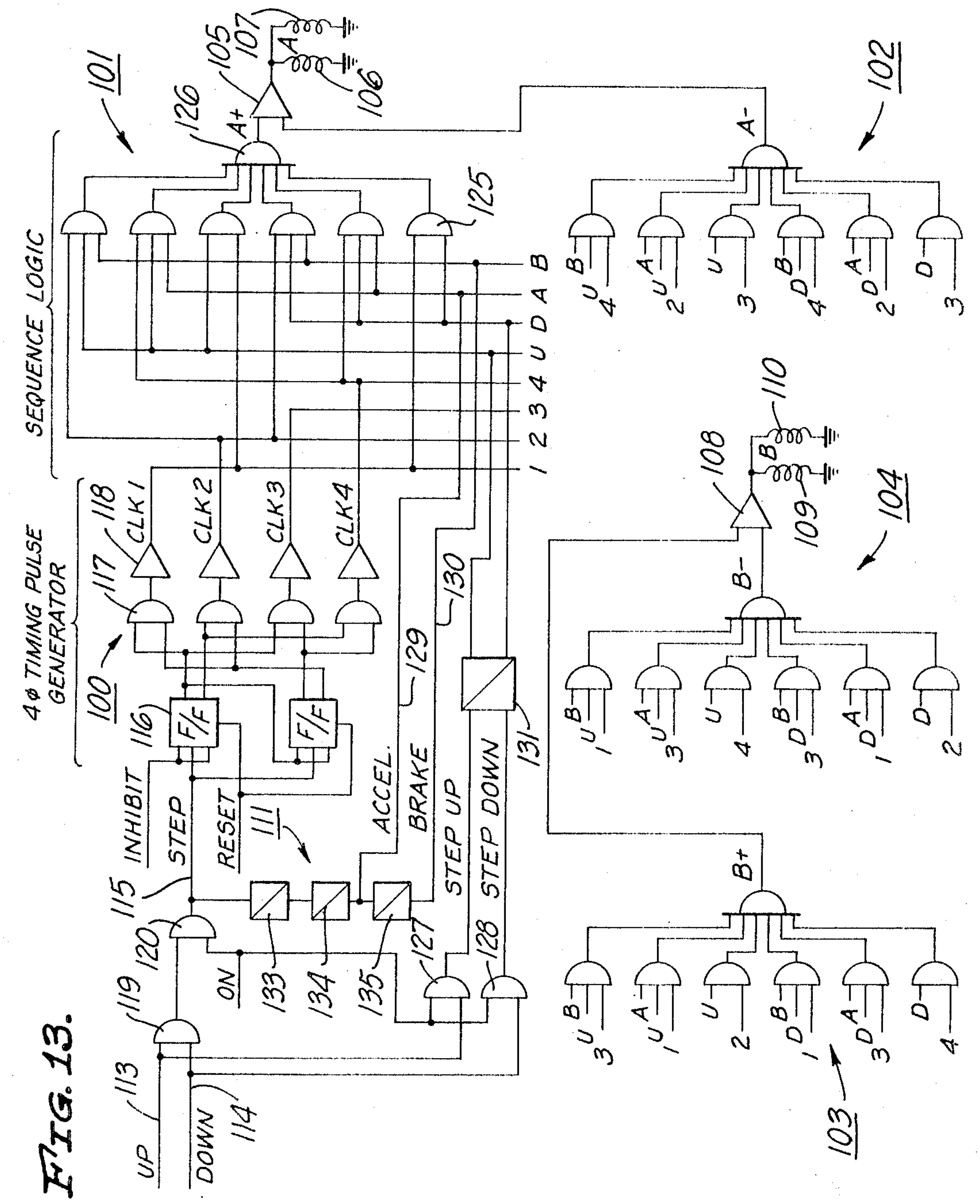
FIGURE 13 is an electrical schematic of a preferred circuitry for driving the system.

A circuit for energizing the coils of the magnets is illustrated in FIGURE 13 and includes a timing pulse generator 100 and A+ logic unit 101, an A− logic unit 102, a B+ logic unit 103, and a B− logic unit 104. An A phase driver amplifier 105 provides the current for coils 106, 107 of the A phase magnets. A B phase driver amplifier 108 provides current for the coils 109, 110 of the B phase magnets. An acceleration and braking timing circuit 111 provides the acceleration and braking control. This latter circuit is a desirable but not a necessary feature of the system.

The circuit of FIGURE 13 provides control for one axis. A similar circuit will be utilized for the other axis. A step-up signal is applied to input line 113 for moving the head in one direction and a step-down signal is applied to line 114 for moving the head in the opposite direction. The timing generator 100 provides timing pulses for operation of the circuit on four output lines indicated clock 1, clock 2, clock 3 and clock 4 in response to step signals on line 115. The operation of the timing generator is illustrated in the bottom four lines of the timing diagram of FIGURE 14. The timing generator includes two flip flops 116, four gates 117, and four output amplifiers 118. The step signals on lines 113 and 114 are connected to line 115 via a gate 119 and a gate 120. The gate 119 provides for combining the up and down signals and the gate 120 prevents operation of the circuit unless there is a signal on an ON line indicating that the system has been turned on. This is desirable, since step signals may come from remote sources not necessarily under the control of the operator of the plotter. A reset line provides for a resetting of the timing generator to its initial state. An inhibit line provides for inhibiting operation of the circuit when certain criteria are not met, such as air pump not on.

Each of the sequence logic units has six gates 125 with the outputs of these gates combined at another gate 126 to provide the coil signal as an input to a driver amplifier. A signal from the A+ logic unit produces a positive current in the A phase coil and a signal from the A− logic unit provides a negative current in the A phase coil. The B phase units operate in similar fashion. The outputs of the timing generator are connected to the gates of the sequence logic units in the pattern indicated. The step-up and step-down signals are connected through gates 127 and 128, respectively, and a flip flop 131, which provides a continuous output. Acceleration and brake signals are provided on lines 129 and 130, respectively.

The acceleration and brake timing unit 111 may comprise three monostable flip flops or one shot blocking oscillators 133, 134, 135, connected in series and driven from the step line 115. The flip flop 133 is set by a step signal. The flip flop 134 is set when the flip flop 133 resets, initiating the acceleration signal. The flip flop 135 is set when the flip flop 134 resets, initiating the brake signal.

Figure 14:
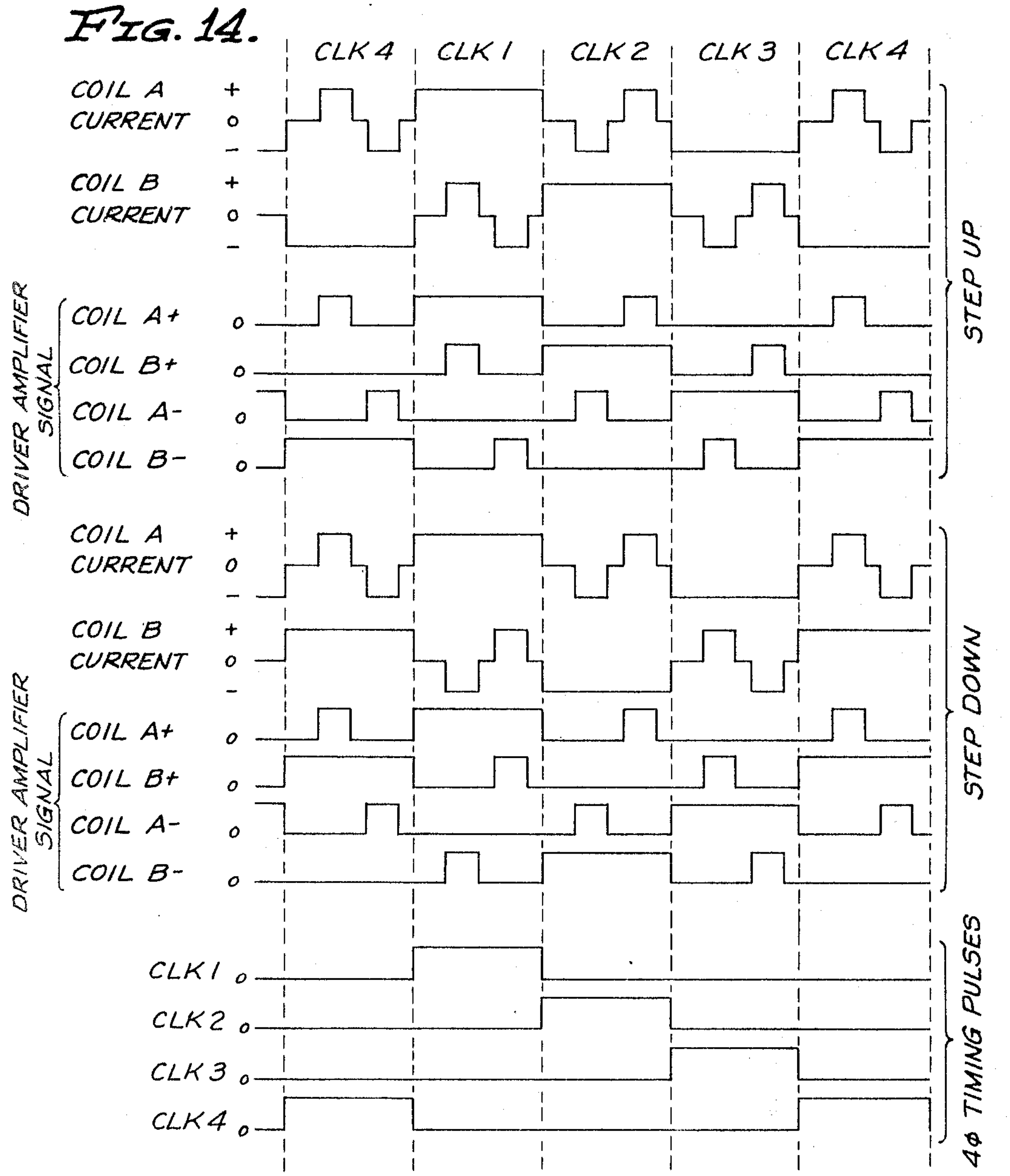
FIGURE 14 is a timing diagram of the operation of the circuitry of FIGURE 13.

Referring to FIGURE 14, the diagram of FIGURE 11 illustrates the status at the end of a clock 1 time. A step-up signal will initiate clock 2 time bringing the A+ coil signal to zero and generating B+ coil signal. The A coil current will go to zero and a positive current will be produced in the B coil. Shortly thereafter, the acceleration signal on line 129 will produce an A− coil signal resulting in a negative current in coil A. Then the brake signal on line 130 will produce an A+ coil signal causing a positive current in coil A. Another step-up signal will initiate clock 3 time with the same sequence of operation occurring with different coil signals and coil currents, as illustrated in FIGURE 14.

Although exemplary embodiments of the invention have been disclosed and discussed, it will be understood that other applications of the invention are possible and that the embodiments disclosed may be subjected to various changes, modifications and substitutions, including those discussed in my aforesaid co-pending application, without necessarily departing from the spirit of the invention. The invention has been disclosed used as a chart plotter with a pen, but other tools such as light sources, heat sources, cutting edges and the like may be driven for a variety of positioning purposes.

I claim:

1. In a system for relative movement of two members along two axes the combination of:

a plate member having at one surface thereof a grid of nonmagnetic material enclosing zones of magnetic material, said grid defining a first axis and a second axis in the plane of said surface;

a head member having a first set of magnets aligned with said first axis, a second set of magnets aligned with said second axis, a third set of magnets disposed parallel with said first set, and a fourth set of magnets disposed parallel with said second set;

each of said sets of magnets comprising two magnets, each of said magnets having two pole pieces with the spacing between center lines thereof *np*, where *n* is any whole number and *p* is the pitch of said grid, each of said pole pieces having first and second pole faces with the spacing between center lines thereof $p(n\pm\frac{1}{2})$, with the magnets of each of said sets having a spacing between center lines of corresponding pole faces of $p(n\pm\frac{1}{4})$;

each of said magnets having means defining a magnetic flux path between the pole pieces thereof and means for establishing a bias flux therein, each of said magnets having a driving coil for producing a flux at one pole face of each pole piece aiding the bias flux and a flux at the other pole face opposing the bias flux;

means for selectively energizing corresponding coils of said first and third sets for producing relative movement between said members along said first axis; and means for selectively energizing corresponding coils of said second and fourth sets for producing relative movement between said members along said second axis.

2. A system as defined in claim 1 with the magnets of one of said first and third sets and one of said second and fourth sets having a spacing between center lines of corresponding pole faces of $p(n+\frac{1}{4})$ and with the magnets of the other of said first and third sets and of the other of said second and fourth sets having a spacing between center lines of corresponding pole faces of $p(n-\frac{1}{4})$.

3. A system as defined in claim 1 with the spacing of the magnets of said first and third sets such that the sign is the same for each in the spacing expression $p(n\pm\frac{1}{4})$, and with the spacing of the magnets of said second and fourth sets such that the sign is the same for each in the spacing expression.

4. A system as defined in claim 1 in which said means defining a flux path and for establishing a bias flux comprises a permanent magnet.

5. A system as defined in claim 1 in which said means defining a flux path and for establishing a bias flux comprises a yoke of magnetic material bridging the pole pieces and current conductor means positioned adjacent said yoke.

6. A system as defined in claim 1 wherein each of said pole faces extends over a plurality of said zones of said plate member, with each pole face having a plurality of rows of magnetic material spaced by nonmagnetic material, with the spacing of said rows substantially the same as the spacing of said zones.

7. A system as defined in claim 1 in which each of said sets of magnets includes a frame and each of said pole pieces comprises a stack of laminations, with said stacks slidably inserted in said frame along an axis perpendicularly to said pole faces, and in which said means defining a flux path includes a yoke mounted to said frame and bridging said pole pieces.

8. A system as defined in claim 7 including a housing having an apertured surface with each frame mounted in an aperture, with the pole faces flush with said housing.

9. A system as defined in claim 1 in which each of said means for energizing includes:

first and second inputs for receiving first and second opposite direction stepping signals;

a four phase timing generator for generating timing signals sequentially on four timing lines in response to step signals at said inputs;

a first step logic circuit having said timing and stepping signals as inputs for generating a positive coil current signal for one magnet of a set;

a second step logic circuit having said timing and stepping signals as inputs for generating a negative coil current signal for said one magnet of a set;

a third step logic circuit having said timing and stepping signals as inputs for generating a positive coil current for the other magnet of the set;

a fourth step logic circuit having said timing and stepping signals as inputs for generating a negative coil current signals for said other magnet of the set; and amplifier means actuated by said coil current signals for driving said coils.

10. A system as defined in claim 9 including:

an acceleration and brake circuit for sequentially generating an acceleration signal and a brake signal in response to step signals at said inputs, which said acceleration and brake signals occurring within the duration of timing signal, and with said acceleration and brake signals connected as inputs into each of said step logic circuits to provide acceleration and brake current in the coil of one magnet of a set while the coil of the other magnet of the set is energized for a step.

11. In a system for relative movement of two members, the combination of:

a plate member having at one surface thereof an alternating pattern of nonmagnetic material and magnetic material;

a head member having first and second parallel sets of magnets aligned with said pattern;

each of said sets of magnets comprising two magnets, each of said magnets having two pole pieces with the spacing between center lines thereof $np$, where $n$ is any whole number and $p$ is the pitch of said pattern, each of said pole pieces having first and second pole faces with the spacing between center lines thereof $p(n\pm\frac{1}{2})$, with the magnets of said sets having a spacing between center lines of corresponding pole faces of $p(n\pm\frac{1}{4})$;

each of said magnets having means defining a magnetic flux path between the pole pieces thereof and means for establishing a bias flux therein, each of said magnets having a driving coil for producing a flux at one pole face of each pole piece aiding the bias flux and a flux at the other pole face opposing the bias flux; and means for selectively energizing corresponding coils of said sets for producing relative movement between said members along said pattern.

12. In a system for relative movement of two members along two axes, the combination of:

a plate member having at one surface thereof a grid of nonmagnetic material and enclosing zones of magnetic material, said grid defining a first axis and a second axis in the plane of said surface;

a head member having a first set of magnets aligned with said first axis and a second set of magnets aligned with said second axis;

each of said sets of magnets comprising two magnets, each of said magnets having two pole pieces with spacing between center lines thereof $np$, where $n$ is any whole number and $p$ is the pitch of said grid, each of said magnets having two pole pieces with the faces with the spacing between center lines thereof $p(n\pm\frac{1}{2})$;

with the magnets of said first set and of said second set having a spacing between center lines of corresponding pole faces of $p(n\pm\frac{1}{4})$;

each of said magnets having means defining a magnetic flux path between the pole pieces thereof and means for establishing a bias flux therein, each of said magnets having a driving coil for producing a flux at one pole face of each pole piece aiding the bias flux and a flux at the other pole face opposing the basis flux;

means for selectively energizing the coils of said first set for producing relative movement between said members along said first axis; and means for selectively energizing the coils of said second set for producing relative movement between said members along said second axis.

13. In a system for relative movement of two members, the combination of:

a plate member having at one surface thereof an alternating pattern of nonmagnetic material and magnetic material;

a head member having a set of magnets aligned with said pattern and comprising two magnets, each of said magnets having two pole pieces with the spacing between center lines thereof $np$, where $n$ is any whole number and $p$ is the pitch of said pattern, each of said pole pieces having first and second pole faces with the spacing between center lines thereof $p(n\pm\frac{1}{2})$;

with the magents of said set having a spacing between center lines of corresponding pole faces of $p(n\pm\frac{1}{4})$;

each of said magnets having means defining a magnetic flux path between the pole pieces therof and means for establishing a bias flux therein, each of said magnets having a driving coil for producing a flux at one pole face of each pole piece aiding the bias flux and a flux at the other pole face opposing the bias flux; and means for selectively energizing the coils of said set for producing relative movement between said members along said pattern.

References Cited

UNITED STATES PATENTS

| | | | |
|---|---|---|---|
| 2,833,941 | 5/1958 | Rosenberg et al. | 307—149 |
| 3,146,386 | 8/1964 | Gerber | 318—8 |
| 3,268,747 | 8/1966 | Snowdon | 318—135 X |
| 3,273,727 | 9/1966 | Rogers et al. | 310—13 X |
| 3,357,511 | 12/1967 | Mackie | 310—13 X |

MILTON O. HIRSHFIELD, Primary Examiner

D. F. DUGGAN, Assistant Examiner

U.S. Cl. X.R.

310—13; 318—135, 162